UNITED STATES PATENT OFFICE.

ERNST SAAM, OF LUDWIGSHAFEN-ON-THE-RHINE, GERMANY, ASSIGNOR TO THE FIRM OF KNOLL AND COMPANY, OF LUDWIGSHAFEN-ON-THE-RHINE, GERMANY.

ALPHA-HALOGEN-ISOVALERYL-UREA AND PROCESS OF MAKING THE SAME.

No. 914,518.    Specification of Letters Patent.    Patented March 9, 1909.

Application filed January 28, 1907. Serial No. 354,465. (Specimens.)

*To all whom it may concern:*

Be it known that I, ERNST SAAM, a subject of the German Emperor, residing at Ludwigshafen-on-the-Rhine, Germany, have invented a certain new and useful Chemical Product, Alpha-Halogen-Isovaleryl-Urea, and Process of Preparing the Same, of which the following is a specification.

If urea is caused to act on alpha-halogen-isovaleryl-bromid or alpha-halogen-isovaleryl-chlorid, urea-compounds of alpha-halogen-isovaleryl are produced which hitherto have not been described in chemical literature, and which form excellent soporifics free from injurious secondary effects. They are suitable in all cases of insomnia which are not caused by physical pains, but by nervous excitement, that is to say in cases, where physicians would rather not use any of the known and more or less objectionable soporifics.

The following examples will explain the details of procedure:

Example I: 2 kilograms of brom-isovaleryl-bromid are intimately mixed with one kilo of finely pulverized and well-dried urea. The urea is thereby slowly dissolved, and spontaneous heating of the mixture up to about 70° C. takes place. At this temperature the mixture is maintained for several hours, until the bromid is no longer perceptible by its smell. The chemical reaction taking place may be represented by the following equation:—

Subsequently the mass is treated with sodium-bicarbonate, in order to remove any alpha-brom-isovaleric acid that may have been formed and also the hydrobromic acid. The product remaining behind is dried and recrystallized from toluene or water.

The urea compound of alpha-brom-isovaleryl forms small white and almost tasteless needles, which are easily soluble in hot water, alcohol, ether and in alkalies; but sparingly soluble in cold water. From its solution in a ten per cent. soda lye the new compound is precipitated by the addition of acids. Its melting point is 154° C.

Example II: To 331 grams of isovaleryl-chlorid are added 480 grams of bromin by causing the latter to flow into the former, and the mixture is heated upon a water-bath until the color of bromin has disappeared. Subsequently the liquid is subjected to fractional distillation *in vacuo*, whereby at 20 millimeters pressure and a temperature of 90 to 110° C. a clear liquid is obtained which represents the chlorid of alpha-brom-isovaleryl. The latter is then treated as described in Example I. The chemical reaction may be represented by the following equations:—

(a) 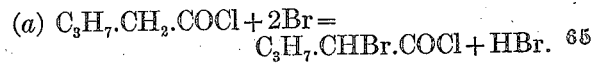

(b) 

Example III: 2 kilograms of alpha-chlor-isovaleryl-chlorid, produced from alpha-chlor-isovaleric acid and phosphorus oxychlorid, are mixed with 2.5 kilograms of urea, and the mixture is then left to itself. The temperature rises to about 35° C. When the temperature has fallen, the product is heated on the water-bath, until the odor of the chlorid has disappeared. The mass is then treated with a solution of sodium bicarbonate, the product remaining behind is dried and recrystallized from toluene or water. The chemical reaction may be represented by the following equation:

The urea compound of alpha-chlor-isovaleryl melts at 139° C. and resembles as regards its other properties the urea-compound of alpha-brom-isovaleryl.

Example IV: 2 kilograms of alpha-chlor-isovaleryl-bromid produced from alpha-chlor-isovaleric acid and phosphoric tribromid, are mixed with 2 kilograms of urea. In other respects the treatment is as in Example 3. The chemical reaction may be represented by the following equation:

In the above examples the urea combines with the chlorid or bromid of alpha-isovaleryl in the proportion of one molecule of the former to one molecule of the latter.

What I claim is:—

1. The herein described process for obtaining urea-compounds of alpha-halogen-isovaleryl, which consists in causing urea to act on a halogen compound of alpha-halogen-isovaleryl in the proportion of one molecule of the former to one molecule of the latter, treating the resulting mass with sodium-bicarbonate, then drying and recrystallizing the resulting product.

2. The herein described process for the manufacture of alpha-brom-isovaleryl-urea, which consists in causing urea to act on alpha-brom-isovaleryl bromid, treating the resulting mass with sodium-bicarbonate, then drying and recrystallizing the resulting product.

3. As new products of manufacture, urea compounds of alpha-halogen-isovaleryl obtainable from ureas and the halogenids of alpha-halogen-isovaleryl in molecular proportions, the said compounds being crystallizable as small white needles capable of melting without decomposition, said needles being easily soluble in hot water, alcohol, ether and alkalies, sparingly soluble in cold water, capable of being precipitated from their solution in a 10 per cent. soda lye by the addition of acids, easily vaporized by heating, almost tasteless and possessing soporific properties.

In witness whereof I have hereunto set my hand in presence of two subscribing witnesses.

ERNST SAAM.

Witnesses:
 MAX DRAEGE,
 OSWALD KRUG.